United States Patent
Oyama

(10) Patent No.: US 7,154,635 B2
(45) Date of Patent: Dec. 26, 2006

(54) PRINT JOB MANAGEMENT METHOD AND APPARATUS

(75) Inventor: Shingo Oyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 808 days.

(21) Appl. No.: 10/235,565

(22) Filed: Sep. 6, 2002

(65) Prior Publication Data

US 2003/0053128 A1    Mar. 20, 2003

(30) Foreign Application Priority Data

Sep. 14, 2001   (JP) ............................ 2001-280759

(51) Int. Cl.
*G06F 15/16* (2006.01)

(52) U.S. Cl. ........................ 358/1.9; 358/1.15; 709/219; 709/245

(58) Field of Classification Search ............... 358/1.15, 358/1.9; 705/219, 245
See application file for complete search history.

(56) References Cited

U.S. PATENT DOCUMENTS

| | | | | |
|---|---|---|---|---|
| 5,873,659 | A * | 2/1999 | Edwards et al. | 400/61 |
| 6,163,383 | A * | 12/2000 | Ota et al. | 358/1.1 |
| 6,348,972 | B1 * | 2/2002 | Taniguchi et al. | 358/1.15 |
| 6,453,127 | B1 * | 9/2002 | Wood et al. | 399/8 |
| 6,615,234 | B1 * | 9/2003 | Adamske et al. | 709/203 |

* cited by examiner

*Primary Examiner*—Kimberly Williams
*Assistant Examiner*—Peter K. Huntsinger
(74) *Attorney, Agent, or Firm*—Fitzpatrick, Cella, Harper & Scinto

(57) ABSTRACT

Disclosed are a method and apparatus for managing a print job generated in response to a print command that is input from an external unit. When the name of a user whose has logged in from a terminal is acquired and a print command corresponding to this user name is entered, a job that uses the logged-in user name is generated as the owner name of the print job based upon the print command. When the status of the job is displayed, the user name is displayed as the owner name.

12 Claims, 11 Drawing Sheets

FIG. 8

| | | DOCUMENT | | | | | _ □ × |
|---|---|---|---|---|---|---|---|
| File(F) Edit(E) View(V) Favorite(A) Tool(T) Help(H) | | | | | | | |

Ganon

| Preview | Device | Move/Delete | Print Form | Print | Save | Register Printer | Job |

Job

[▲] [✗]                                                          [ Refresh ]

Last Update 2000/04/01 12:34

| SELECT | DOCUMENT NAME | STATUS | OWNER | ACCEPTANCE DATE | PRINTER |
|---|---|---|---|---|---|
| ☐ | 📄 Document 11 | PRINTING IN PROGRESS | fujiwara | 2000/04/01 12:34 | iR5000-6000 |
| ☐ | 📄 No name | STANDBY | Anonymous | 2000/04/01 12:35 | iR5000-6000 |
| ☐ | 📄 Schedule.doc | STANDBY | momochan | 2000/04/01 13:36 | iR5000-6000 |
| ☐ | 📄 No name | STANDBY | Anonymous | 2000/04/01 13:35 | iR5000-6000 |
| ☐ | 📄 No name | STANDBY | Anonymous | 2000/04/01 13:35 | iR5000-6000 |

801

🖥 My Computer

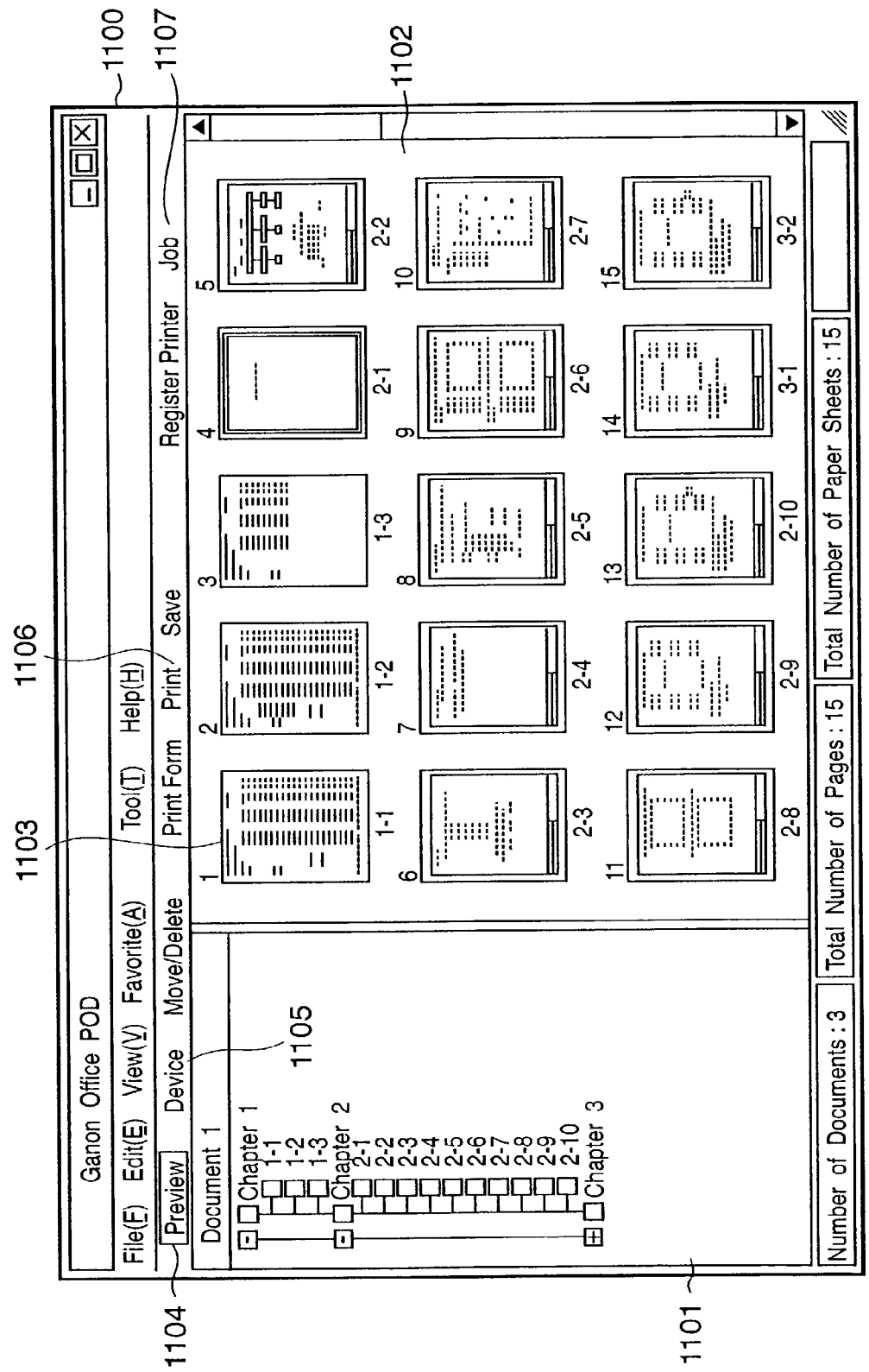

PRINT JOB MANAGEMENT METHOD AND APPARATUS

FIELD OF THE INVENTION

This invention relates to a method and apparatus for managing print jobs in a print service server that executes processing such as print processing specified over a network.

BACKGROUND OF THE INVENTION

So-called POD (Print On Demand) systems have become widespread in recent years. Such a system keeps documents such as manuals, catalogs and conference data in storage in the form of electronic documents and prints out the required number of copies at the required time. Directions issued when a print document is created are converted to an electronic document and the electronic document is attached to the print document, thereby making it possible for anyone to obtain output results that reflect the intention of the individual who created the print document.

Further, the Internet also has become widespread and computers can now be interconnected on a global scale. Systems like the aforementioned POD system are now being provided as Internet services referred to as print services. A conventional form of this system that is in vogue involves running print service software as software on the side of a Web server, accepting a print request from a user as a print order document, and relying upon intervention by a human operator to perform actual print processing and management of print-job status.

In the case of a service provided over an intranet, which is a network of limited scope, a form of print service that does not require operator intervention also is available.

One conceivable approach to a print service that does not rely upon operator intervention is to retain a document in a print management server, for example, and allow a client user to access the print management server via a Web browser of the client's own personal computer and to use the Web browser to specify the printing of the document retained by the print management server. However, with this service mode that does not require operator intervention, the range of services that can be provided is limited by the format of the print document and the capability of the printing apparatus.

Further, by transmitting a print command from the client personal computer to the print management server via the Web browser of the personal computer, the print management server converts the document to be printed to print data using a printer driver that has been installed in the server's own system and phrases the resulting print data in JL (Job Language), thereby transmitting the document to the printer as a print job. Accordingly, when a print job ordinarily is generated through the Windows (registered trademark) operating system, the owner name of the print job is generated by acquiring the name of the computer that created the print job. As a consequence, with a print manager (print job management software) that is supported by the Windows operating system, the name of the owner of the print job generated by the print management server in response to a print command from the Web browser of the client personal computer becomes the name of the computer used by the print management server in the above-mentioned printing system that does not rely upon operator intervention. As a result, the user (the individual who ordered printing) utilizing the client personal computer cannot recognize which print job is the one he or she requested to have printed. This is a major problem in that the user cannot ascertain the status of the print job in question. Thus, the provision of a print service that does not rely upon the intervention of a human operator is such that it is difficult for the user to ascertain the status of a print job.

SUMMARY OF THE INVENTION

Accordingly, an object of the present invention is to provide a print job management method and apparatus whereby the identifier of a user who is receiving provision of a print service is displayed and management of a print job can be performed in accordance with the user with regard to a print job that is currently entered in the system, this being possible even in a print server that provides a print service in which an operator does not intervene.

According to the present invention, the foregoing object is attained by providing a method of managing a print job generated in response to a print command that is input from an external unit, comprising: a step of acquiring a user name; a step of inputting a print command corresponding to the user name; and a job generating step of generating a job, based upon the print command, using the user name as an owner name of the print job.

Preferably, the job generating step includes a step of managing a queue by treating a print command document and the user name as a set; a step of causing an external module to generate an unassigned print job based upon the print command document when it is the job's turn to be processed; and an altering step of altering the owner name of the generated print job to the user name.

Preferably, the method further comprises a job display step of causing status of a print job to be displayed in accordance with the user name acquired, wherein the job display step transmits screen data, which describes the status of the job, to the external unit.

Preferably, the job display step transmits screen data, which describes the status of a print job whose display is allowed with respect to the user name, to the external unit and causes this screen data to be displayed on the external unit.

Preferably, the method of managing a print job described above is executed by a print management server that retains document information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram illustrating a print job management screen;

FIG. 11 is a diagram showing an example of a preview screen.

DETAILED DESCRIPTION OF THE PREFERRED EMBODIMENTS

A preferred embodiment of the present invention will now be described in detail with reference to the accompanying drawings.

<System Configuration>

Figure 1:
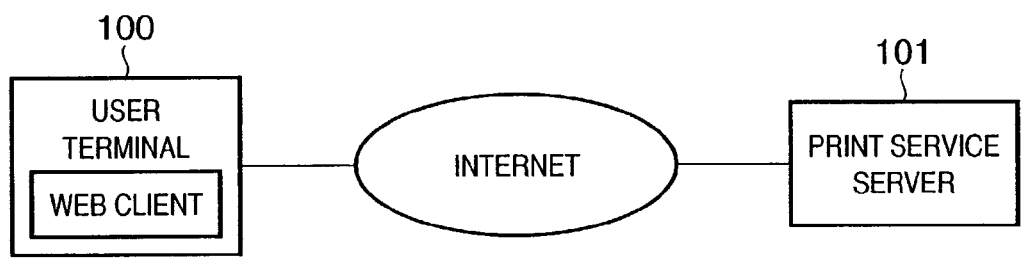
FIG. 1 is diagram showing a first configuration of a print service system.
Figure 2:
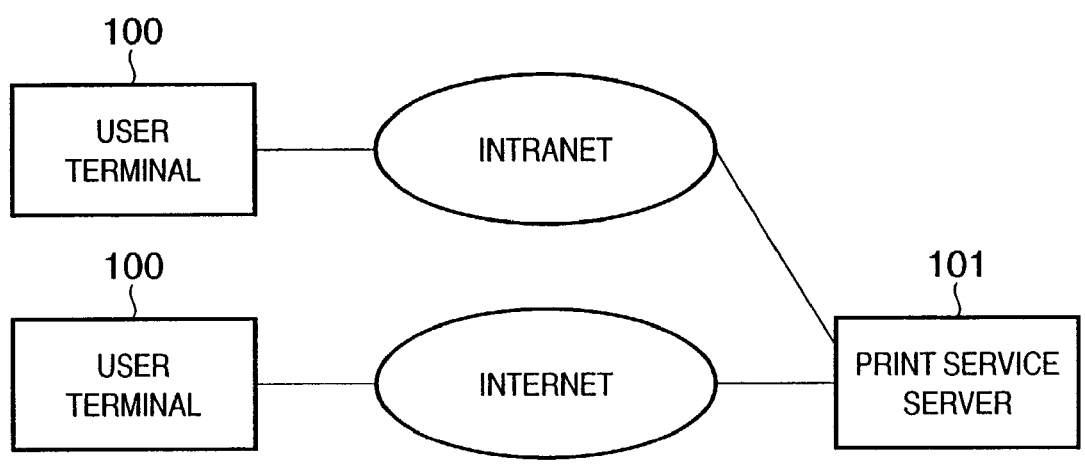
FIG. 2 is diagram showing a second configuration of a print service system.

A print service system to which this embodiment of the invention is applied will be described first. FIGS. 1 and 2 are diagrams illustrating examples of configurations of print service systems according to this embodiment.

As shown in FIG. 1, a user terminal (host computer) 100 is a tool for accessing the present print service system. The user terminal, which may be a personal computer having an interface for interfacing a communication line, is equipped with a generally available Web browser program in order to implement a graphic user interface that interfaces a print service server 101. The print service server (also referred to as a print management unit) 101 is an embodiment ideal as the print job management apparatus of the present invention and performs operational management and service management of the overall print service. Though only one user terminal is indicated in this diagram illustrative of the basic configuration, the service would be run for a plurality of users when put into operation.

In FIG. 1, both the user terminal 100 and print service server 101 are protected from external intrusion by a so-called firewall (not shown), which prevents against illegal entry from the outside, by a function such as packet filtering. The arrangement of FIG. 1 illustrates an operational configuration in which the user terminal 100 and print service server 101 are both disposed in a network (the Internet) that exceeds the firewall. More specifically, the system configuration is such that the user terminal 100 and print service server 101 are connected to the Internet and the user terminal 100 accesses the print service server 101 so that the printing of a prescribed document can be performed at the print service server 101.

FIG. 2 illustrates an example of a system that includes not only an arrangement similar to that of FIG. 1, in which the user terminal 100 and print service server 101 are connected to the Internet, which is a network that exceeds the firewall, but also an arrangement in which the print service server 101 and user terminal 100 are connected to a network (intranet) located within the firewall. In any case, the basic mode of service operation is equivalent to that of FIG. 1.

Means for accessing the print service server 101 relies principally upon the usual Internet protocol (HTTP: Hyper-Text Transfer Protocol, etc.), and the system is run using ordinary means typified by an SSL (Secure Socket Layer) to assure security. In this embodiment, therefore, the user terminal 100 is equipped with a Web client and the print service server 101 uses a server module (described later) to implement HTTP. Furthermore, according to this embodiment, a Web server is not particularly provided. However, the print service server 101 may be provided with a generally available Web server and various modules illustrated in FIG. 3 can be implemented by a so-called CGI program executed via the Web server in interaction with a Web browser installed in the user terminal 100.

Figure 9:
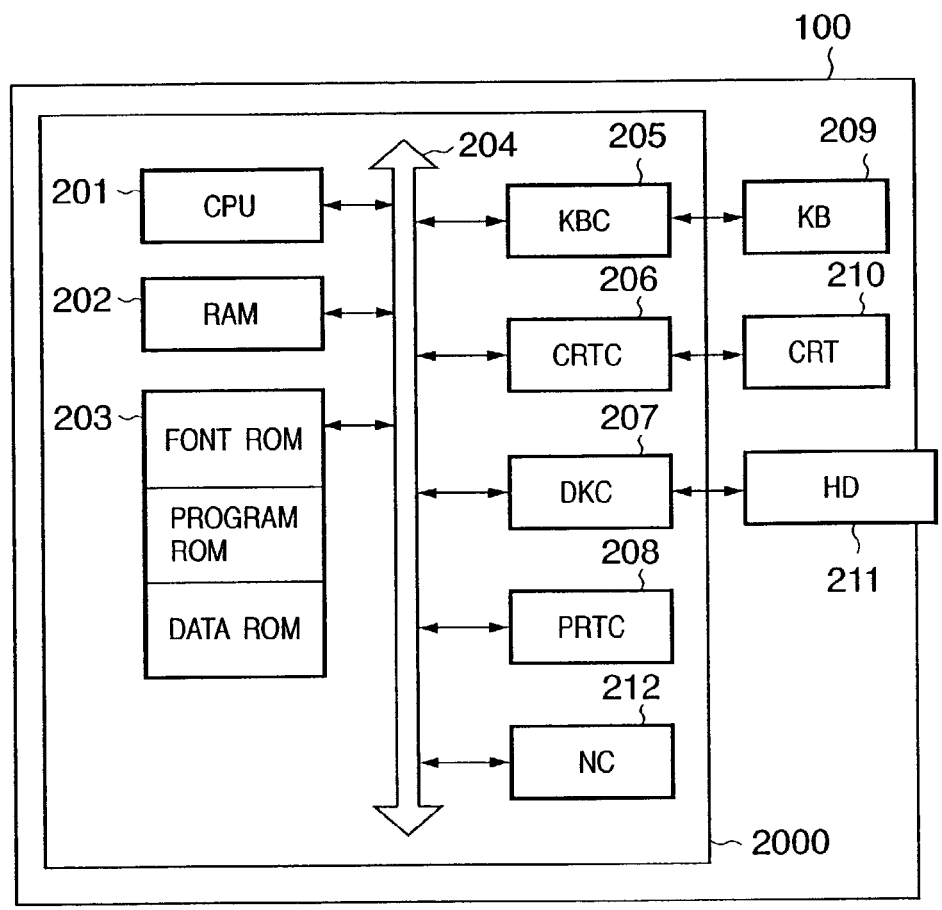
FIG. 9 is a block diagram of a computer.

FIG. 9 illustrates an example of a personal computer for implementing the user terminal 100. The print service server 101 also can be implemented through a similar arrangement. In FIG. 9, a CPU 201 executes an operating system and an application program such as a Web browser stored in a program ROM of a ROM 203 or downloaded from a hard disk 211 to a RAM 202, and runs various program modules (described later) in the server. The RAM 202 functions as the main memory and work area of the CPU 201. A keyboard controller (KBC) 205 controls inputs from a keyboard 209 and pointing device, which is not shown. A CRT controller (CRTC) 206 controls a display presented by a CRT display 210. A disk controller (DKC) 207 controls access to a hard disk (HD) 211, which stores a booting program, various applications, font data and user files, etc., and to a floppy disk, which is not shown. A PRTC 208 controls an exchange of signals with a connected printer 107. An NC 212 is connected to the Internet via a telephone line or the like or is connected to an intranet such as a LAN and executes communication control processing for communicating with a server or another terminal device such as a user terminal connected to the network.

<Software Configuration of Print Service Server>

Figure 3:
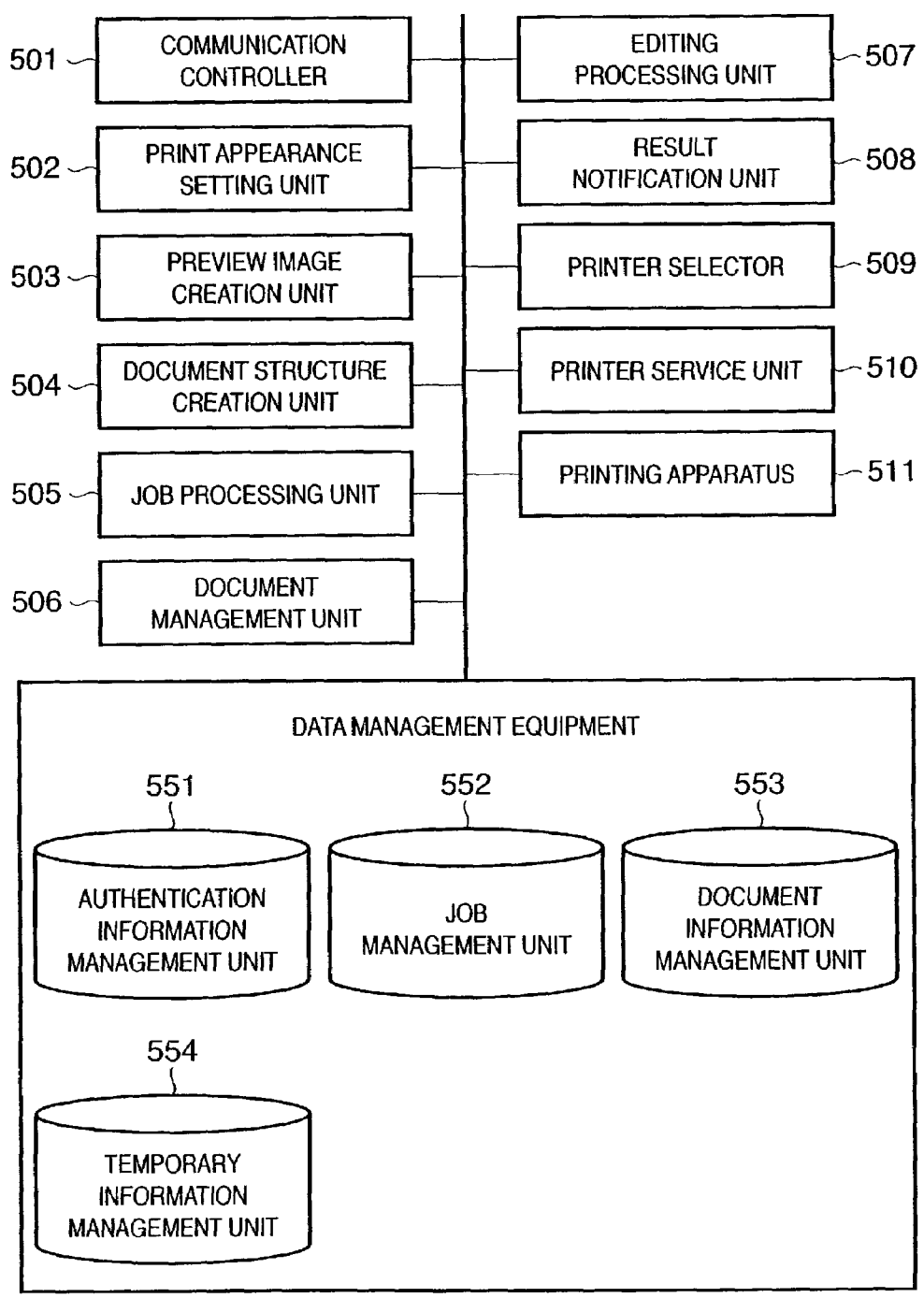
FIG. 3 is a block diagram of a print service system.

FIG. 3 illustrates the functional blocks of the print service server 101 according to this embodiment.

A communication controller 501 executes data communication processing for communicating data with the user terminal 100 and print service server 101. Processing such as user authentication is executed using data that has been managed by an authentication information management unit 551. In this embodiment, the print service server 101 is connected to the user terminal by HTTP and therefore processing for this protocol also is executed here.

A print appearance setting unit 502 executes processing for updating a document, which has been saved in a temporary information management unit (that manages information that is valid only during log-in) 554, by print appearance information set by the user.

A preview image creation unit 503 creates a preview image of a page requested by the user from documents in the temporary information management unit 554 and saves the preview image in the temporary information management unit 554. It should be noted that the preview image is not limited to a single image; preview images of a plurality of sheets can also be laid out and displayed on one screen. In such case images of a plurality of sheets would be saved in the temporary information management unit 554. Further, additional information such as a page number would also be attached to each sheet to create the preview screen.

A document structure creation unit 504 executes processing to analyze the sections of a document and the structure of a page and to organize these in a tree structure.

In accordance with print request from the user, a job processing unit 505 saves the relevant document, which has been stored in the temporary information management unit 554, in a job management unit 552.

A document management unit 506 creates a list of documents, which can be utilized by the user, from a document information management unit 553 or saves a document, which has been updated by the job management unit 552 in accordance with a save command from the user, in the document information management unit 553.

An editing processing unit 507 executes processing such as deletion and moving of pages, etc.

A result notification unit 508 creates a character string such as an error display or warning and reports the result of user operation in a case where the user operation is inappropriate.

A printer selector 509 finds usable printers connected to the server and creates a list of printer names, etc., from these printers.

A printer service unit 510 applies scaling to a document saved in the job management unit 552 and awaiting printing and outputs the scaled document to a printing apparatus, which is described in the document, in accordance with a queuing rule.

Though only a single printing apparatus 511 is illustrated in this block diagram, it is possible to install a plurality of these printing apparatus.

Various data management units operated and managed in this server will described in greater detail. These units may be implemented by a computer provided separately of the print service server 101 or may be implemented by a hard disk or the like provided in the print service server 101.

The authentication information management unit 551 assures full security of passwords corresponding to various user IDs and manages data that is to be managed.

The job management unit 552 manages a document whose printing has been specified by the user and outputs the managed document to the printing apparatus in accordance with a print-service request. Print jobs are stored in the job management unit 552 in the form of a queue in the order in which they are generated and are output successively.

The document information management unit 553 is capable of saving and retrieving documents in accordance with a request from the user. At the timing at which a document is read in from this unit, the document is locked. As a result, other users connected on the network cannot specify and work on the same document.

The temporary information management unit 554 copies a document specified by the user and updates the document in accordance with a variety of requests from the user. The temporary information management unit 554 is utilized to temporarily save a created preview image as well.

<Structure of Document Data>

Figure 10A:
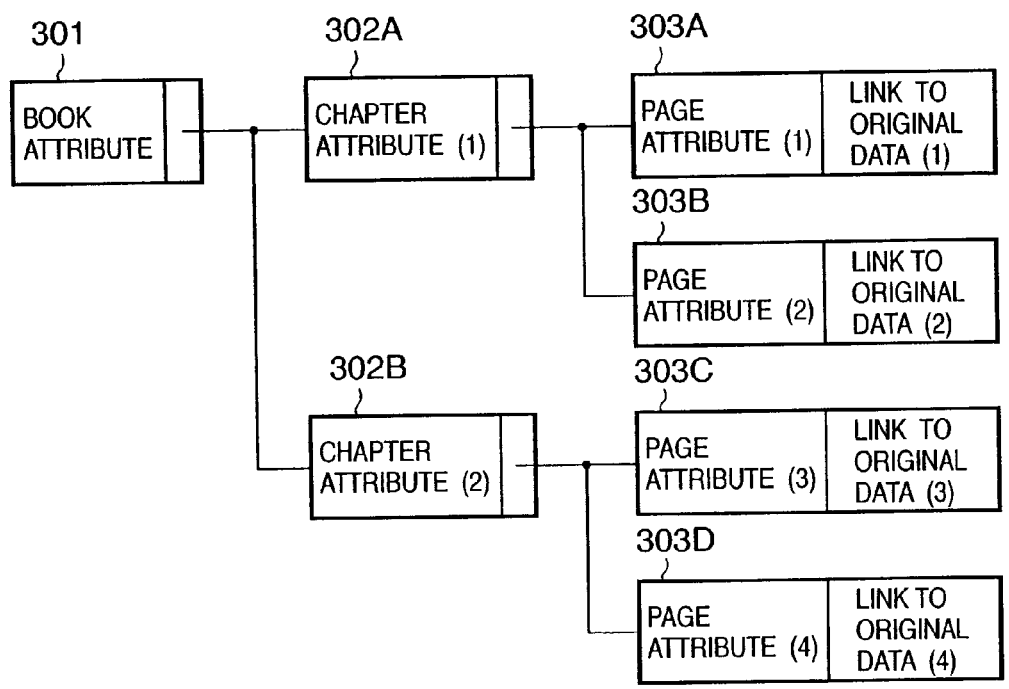
FIGS. 10A and 10B are diagrams illustrating the structure of a document.
Figure 10B:
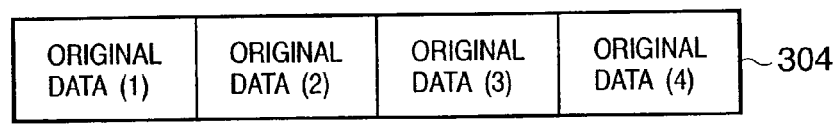

FIGS. 10A and 10B illustrate the data format of a document file created by the document structure creation unit 504, managed by the document management unit 506 and stored in the document information management unit 553. The document file of this embodiment is a single data file obtained by converting data, which has been created by an application program desired by the user, to a prescribed format such as PDF on a page-by-page basis. The document file has a 3-layer hierarchy modelled after writing on a paper medium. The uppermost layer is referred to as a "book" and is modelled after a book of a single volume. Here attributes relating to the book in general are defined, e.g., whether double-sided or single-sided printing has been specified as the printing method and whether printing of a plurality of pages on a single sheet of paper has been specified. The underlying intermediate layer corresponds to a chapter in book terminology and therefore is referred to as a "chapter". For each chapter it is possible to define a chapter attribute. The lowermost layer is referred to as a "page" and corresponds to each page defined by the application program. For each page there can be defined a page attribute. A single book may include a plurality of chapters, and a single chapter can include a plurality of pages.

FIG. 10A shows diagram schematically illustrating an example of the format of a document file. A book, chapters and pages in the document file of this example are displayed by nodes corresponding to them. One document file contains one book. Since book and chapter are concepts for defining a structure in the form of a book, defined attribute values and links to lower layers are included as substance. A page has as substance the data of each page output by the application program. A page, therefore, includes not only the attribute value but also the substance (original page data) of a original page and links to other items of original page data. It should be noted that there are cases where a print page for when the page is to be output to a paper medium or the like includes a plurality of original pages. Items relating to this structure are not displayed by links but are displayed as attributes in each of the book, chapter and page layers.

As shown in FIG. 10A, a book attribute has been defined for a book 301 and two chapters 302A, 302B have been linked to it. The fact that the chapters 302A, 302B are contained in the book 301 is displayed by the links. Pages 303A, 303B are linked to chapter 302A. This indicates that the pages are contained in the chapter. Attributes have been defined for each of the pages 303A, 303B, and the pages include links to original page data (1), (2), which is the substance of these pages. These links point to data (1), (2) of original page data 304 illustrated in FIG. 10B and indicate the fact that the substance of pages 303A, 303B is the original page data (1), (2).

The document file managed and printed out by the print service server 101 in this embodiment has the structure set forth above. In addition, the file holds the print command document, which stipulates the format at the time of printing, together with the document.

<Print Sequence at Server>

Figure 4:
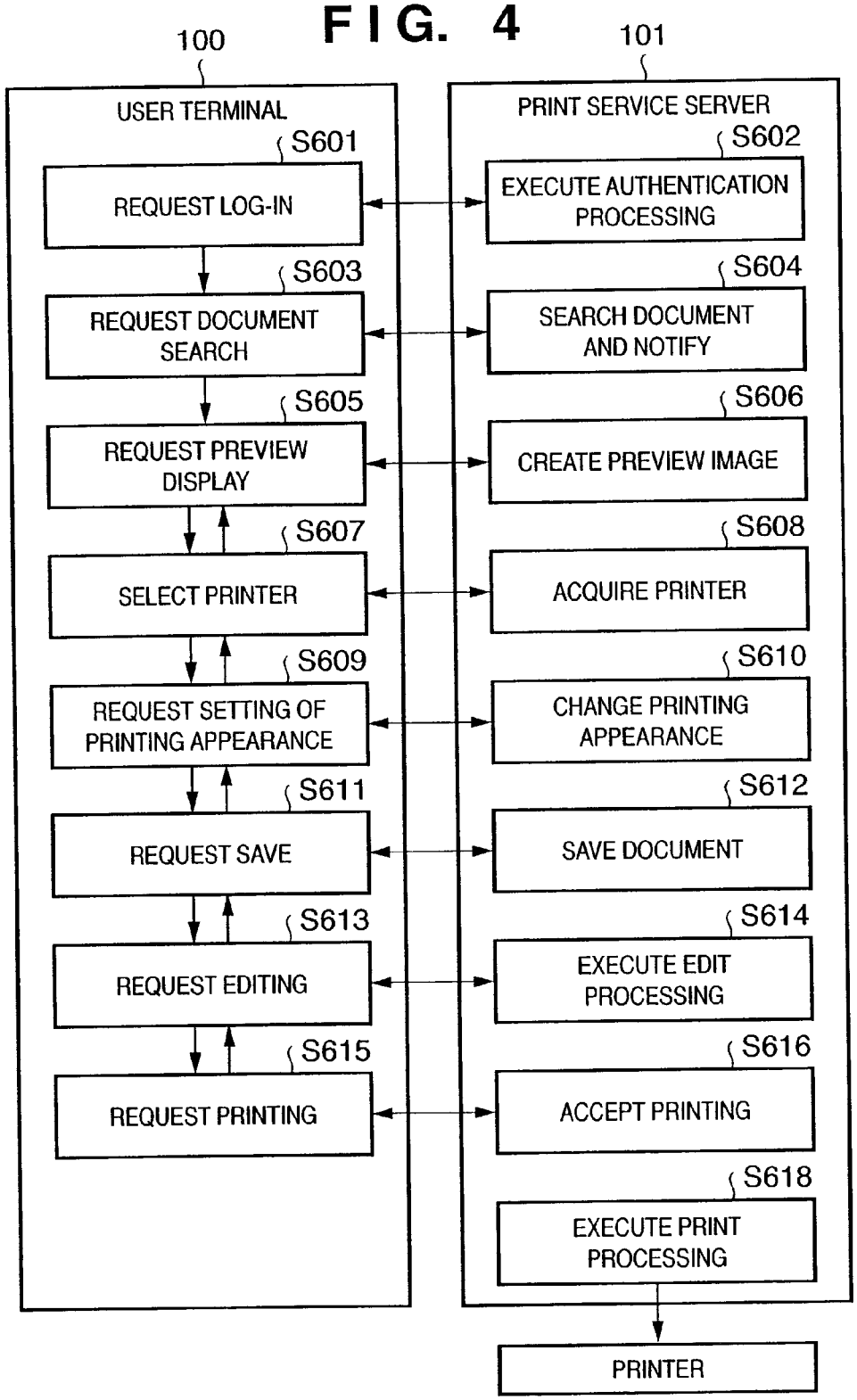
FIG. 4 is a diagram illustrating an example of a print service sequence.

FIG. 4 shows an example of a print-service sequence according to this embodiment. This diagram illustrates a sequence for a case where the user terminal 100 accesses the print service server 101 to perform printout. The basic processing flow will be described below. With regard to a print request, the user employs the Web browser of the user terminal 100 to access an URL (Uniform Resource Locator) that has been assigned to the print service based upon the print service server 101, and receives a screen image from the server 101. The screen carries a description for log-in purposes. The user uses this screen to enter a separately acquired account number and password, etc. This holds similarly for all messages in FIG. 4. Messages from the server 101 to the user terminal 100 are coded in HTML.

Thus, when log-in request processing for a request from the user terminal to the print service server is executed at step S601, the communication controller 501 of the server executes authentication processing at step S602 by referring to authentication information being managed by the authentication information management unit 551. Whether access is allowed or not is reported to the user who is attempting to log in. If access is allowed, screen data for entering the identifier of a document to be printed or screen data for retrieving a document is transmitted to the user terminal 100. As shown in FIG. 11 the following buttons are displayed on the screen after log-in: a Preview button 1104 for displaying a preview; a Device button 1105 for selecting a printer; a Print button 1106 for applying a print command; and a Job button 1107 for displaying a list of print jobs entered in the server. The user can input desired commands to the server 101 from the display screen of the Web browser. Also displayed on this screen are a Printform button for designating print appearance, and a Save button for specifying that a document be saved temporarily. As for the various operations performed at the user terminal 100 in FIG. 4 and the sequence of processing by the server 101 corresponding thereto, it is required that log-in processing be performed first, followed by designation of the document to be printed. Beyond this, however, no particular restrictions apply. The user can perform a desired operation by operating the buttons (the above-mentioned Device button 1105, etc.) included on the screen of the Web browser displayed on the user terminal.

At step S603, the user terminal 100 requests the server 101 to search for a desired document from among document files being managed by the document information management unit 553. In response, the server 101 executes a search for the requested document and reports the result to the user terminal 100 at step S604. For example, if document files that satisfy the search conditions exist, these document files are read out of the document information management unit 553 and are copied to the temporary information management unit 554. The identifiers of these documents and attributes such as the numbers of pages are transmitted to the user terminal 100. As a result, a list of the applicable documents is displayed on the screen of the user terminal 100.

If the user presses the Preview button 1104 at step S605 to request a preview of a specified page from among the documents received at step S604, the server 101 reads the applicable document out of the document information management unit 553, creates a preview image of the specified page in a format stipulated by a print command document retained together with this applicable document and transmits screen data, which includes the image and information such as the page number, to the user terminal 100 at step S606. A plurality of sheets can be displayed on the same screen in this preview mode. The size of the image created is adjusted to the optimum size depending upon the number of display sheets. FIG. 11 is a diagram illustrating an example of a preview display. Here a screen 1100 is split into a tree section 1101 and a preview section 1102. A tree display illustrating the structure of a document that has been selected is included in the tree section 1101, and images 1103 to be printed of each of the pages are included in the preview section 1102. In a case where a page has been specified, however, a display of the tree section 1101 is not included and it will suffice to display only a preview screen of the specified page.

If the user presses the Device button 1105 at step S607, a signal indicative of this is transmitted to the server 101. The server 101 searches all printers 511 that have been connected to the server and communicates a list thereof to the user terminal. If the user selects a printer from this list, the printer name is reported to the server and the name of the printer to be used is saved temporarily as a document together with the designated document in the temporary information management unit 554.

If the user presses the Printform button at step S609 to request the server 101 for a screen to set the appearance of printing, the server 101 sends the user a setting screen, which includes information that can be set for the applicable printer, at step S610. If the user employs this screen to set printer information such as the printing method and type of paper and to transmit the information to the server 101, then, based upon this information, the server 101 updates the printing-appearance setting information contained in the print command document that corresponds to the designated document saved in the temporary information management unit 554.

If the user presses the Save button at step S611 to transmit a save request, then the server 101 executes processing for temporarily saving the document.

If the user requests editing at step S613 by designating an editing menu on the screen, then editing information is communicated to the user terminal at step S614. The result of editing performed by the user in accordance with this information is saved in the server as a temporary document.

Figure 7:
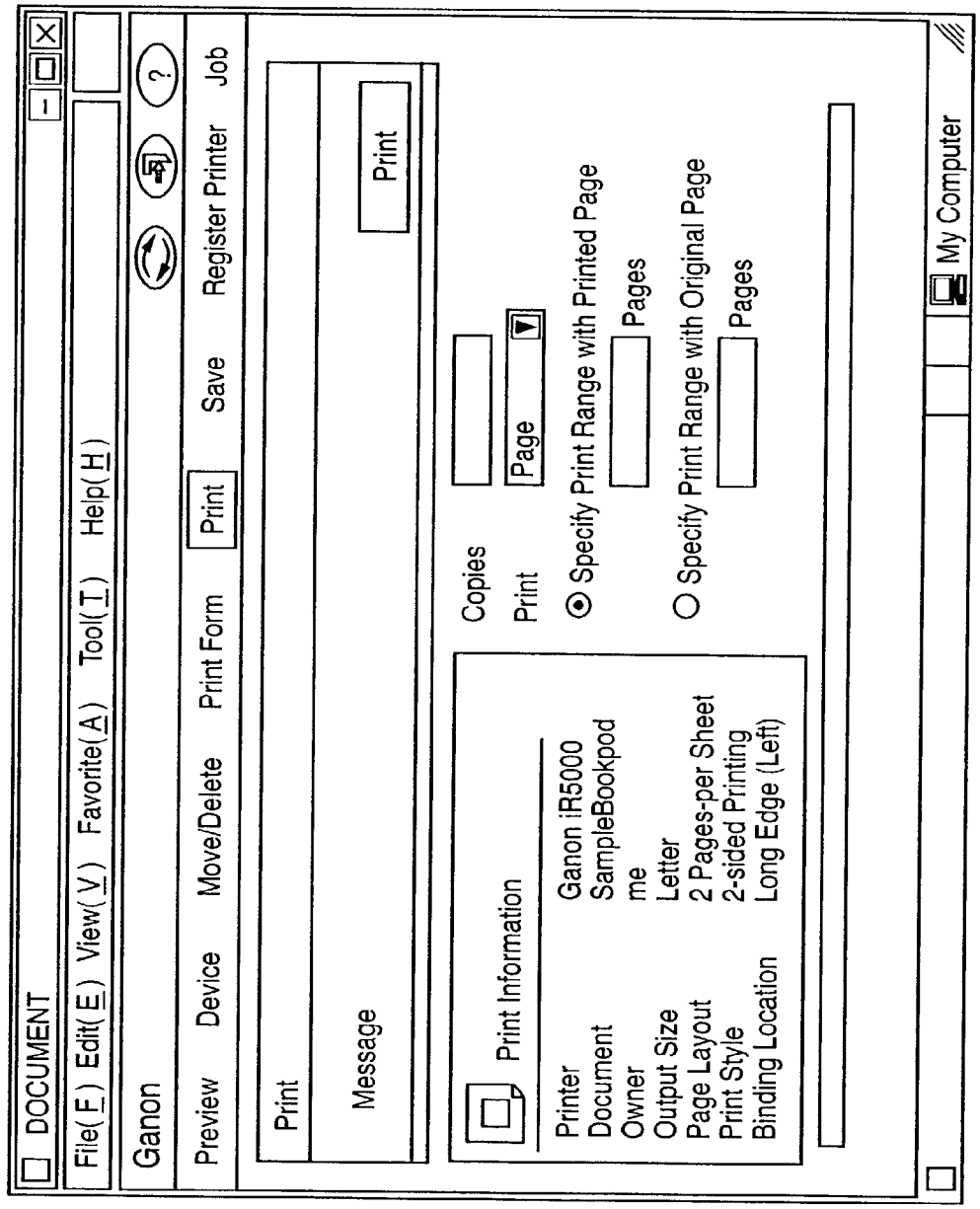
FIG. 7 is a diagram illustrating a print request screen.

If the user presses the Print button 1106 at step S615 to transmit a print request, printing of the temporary document is accepted by the server 101 at step S616. The document for which the print request has been accepted is retained temporarily by the server. When the printer 511 is not busy, the document is output to the printer 511 at a print processing step S618. FIG. 7 illustrates an example of a print request screen displayed at the user terminal 100. The user employs this screen to designate the number of copies and the number of a page to be printed and to command printing.

The screens presented on the user terminal from steps S605 to S615 do not undergo a transition from one to another sequentially and can be selected by the user randomly a necessary.

Thus, as described above, various operating screens are displayed at the user terminal 100 based upon data such as HTML data received from the server 101, and the user issues various requests to the server 101 by operating the buttons set on these screens. The server 101 accepts these requests from the user terminal 100 and executes prescribed processing in accordance with the requests.

Next, the sequence of print acceptance processing at step S616 executed by the print service server 101, which processing is included in the print service sequence shown in FIG. 4, will be described in detail.

Figure 5:
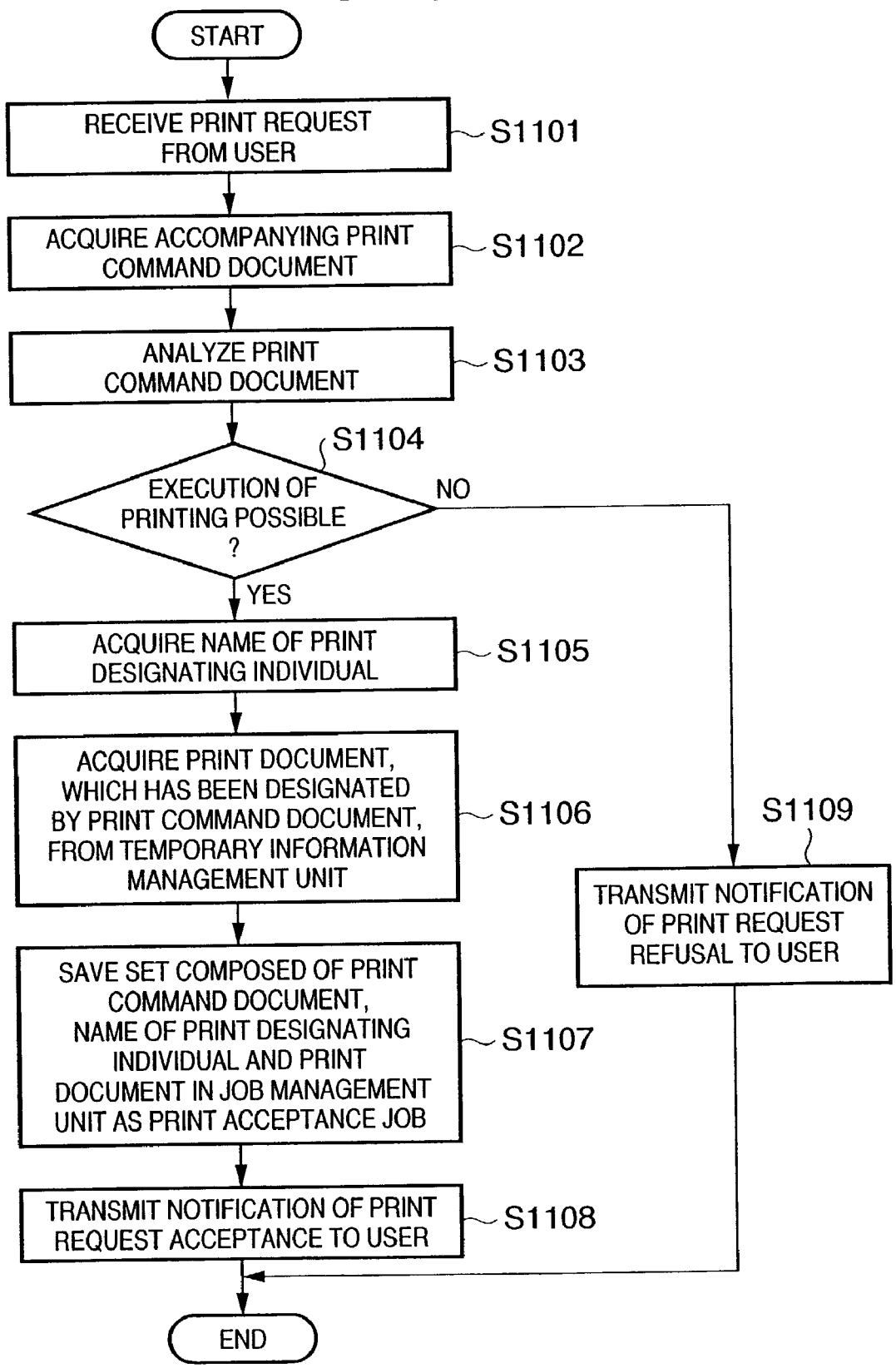
FIG. 5 is a flowchart illustrating a print acceptance processing sequence.

FIG. 5 illustrates an operation performed in print acceptance processing in a case where the user has requested printing. This processing is executed by the job processing unit 505.

First, print acceptance processing is started in response to receipt of a print request from the user at step S1101.

This is followed by step 1102, at which a print command document attached to the document whose printing has been requested at step 1101 is acquired and held in memory.

Next, at step 1103, the print command document retained in memory at step 1102 is opened, a printer is selected and the designated content of a printing-appearance setting is acquired and analysis is performed to determine whether printing in accordance with the designation is possible.

Whether printing in accordance with the print command document is possible is determined at step 1104 based upon the result of analysis at step 1103.

If it is determined that printing is not possible ("NO" at step 1104), the print command document held in memory is discarded and a message screen indicating the printing is not possible it transmitted to the user at step 1109, after which processing ends.

If it is determined that printing is possible ("YES" at step 1104), print acceptance processing continues.

The name of the individual designating printing is acquired from the print command document, which was opened at step 1103, and is held in memory at step 1105.

This is followed by step 1106, at which the print document name and name of the save destination are acquired from the print command document, which was opened at step 1103, and are held in memory.

Next, at step 1107, the print command document retained in memory at step 1102, the name of the individual designating printing retained in memory at step 1105, and the print document acquired from the temporary information management unit based upon the print document name and name of the save destination retained in memory at step 1106 are collected together into a single set, and this is saved in a queue of the job management unit as a print acceptance job in which the print command document and user name constitute one set.

Next, at step 1108, a message screen indicating that the print request has been accepted is transmitted to the user, after which processing is terminated.

Next, the sequence of print processing at step S618 executed by the print service server 101, which processing is included in the print service sequence shown in FIG. 4, will be described in detail.

Figure 6:
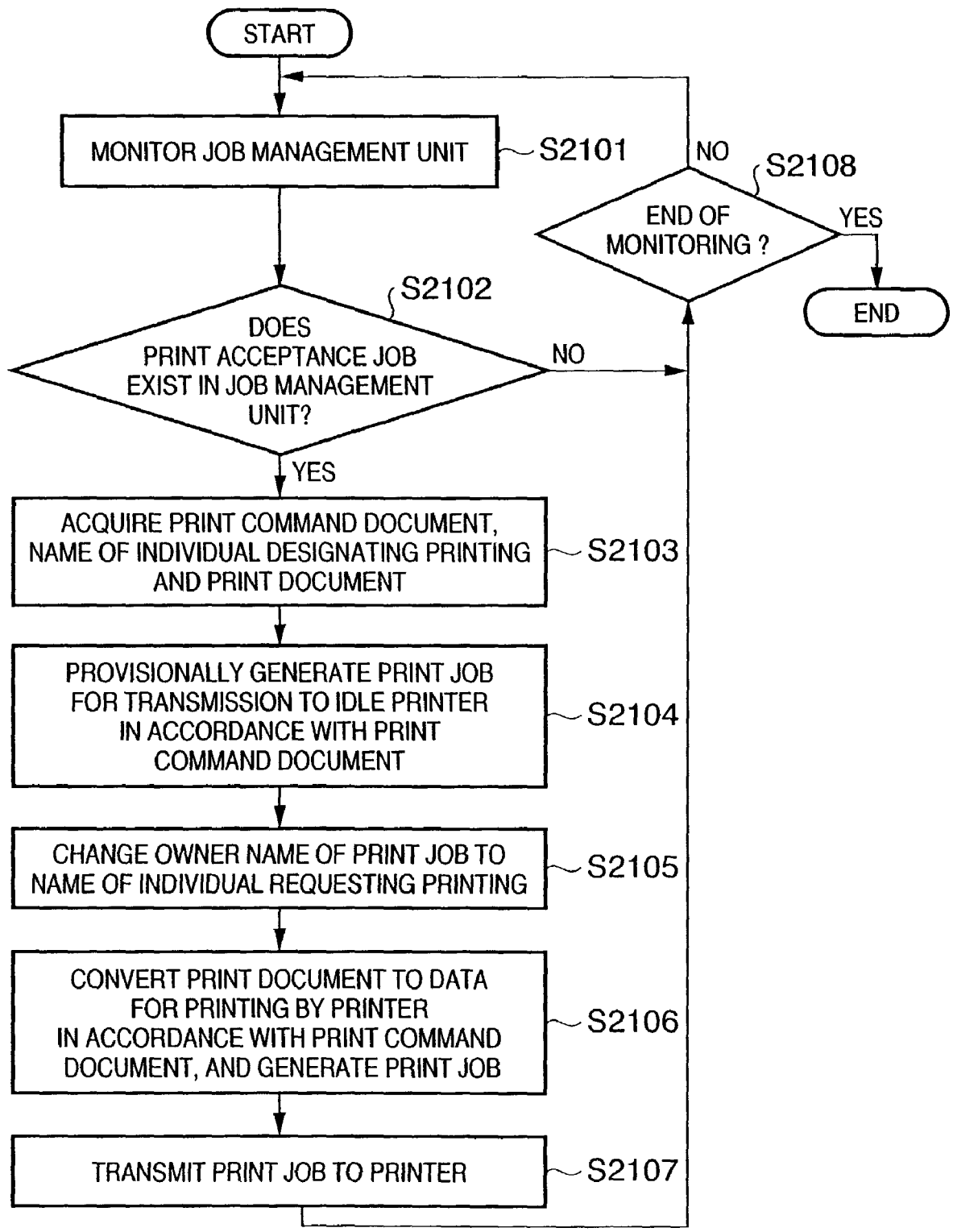
FIG. 6 is a flowchart illustrating a print processing sequence.

FIG. 6 shows a procedure executed by the printer service unit 510. This is a procedure for monitoring the job management unit 552 at all times and executing printing in a case where a print acceptance job exists. It should be noted that the print processing software of FIG. 6 is software for which processing starts at the same time that operation of the print service server 101 starts and ends when the operation of the print service server 101 ends.

The printer service unit 510 accesses the job management unit 552 at step 2101 and checks to see whether print acceptance job exists.

It is determined at step 2102, based upon the result of confirmation performed at step 2101, whether a print acceptance job exists.

If it is determined that a print acceptance job does not exist ("NO" at step 2101), then it is determined at step 2108 whether a print-processing terminate event has occurred. If monitoring ends ("YES" at step 2108), the present processing is exited; otherwise, ("NO" at step 2108) control returns to step 2101.

If it is determined that a print acceptance job does exist ("YES" at step 2101), then processing for monitoring the job management unit 552 is suspended and print processing is started.

Next, at step 2103, the printer service unit 510 acquires in memory the corresponding print command document and name of the individual designating printing from the print acceptance job in job management unit 552. The name of the individual designating printing is the user name that was entered in log-in processing at step 601 in FIG. 4.

Next, at step 2104, in accordance with the command described in the print command document, the printer service unit 510 generates a print job for printer transmission. At this stage the print-job owner name is the name of the owner of the print service server 101. Further, the data of the print document is not included. A print job is generated by having the printer service unit 510 transmit a prescribed command to the operating system that is the environment in which the arrangement of FIG. 3 is implemented. An unassigned print job is generated by a module that is for generating a print job in the operation system. Information serving as the owner name accompanies the generated print job. The user name that has been logged into the operating system is used as the owner name irrespective of log-in from the user in FIG. 4.

The name of the owner of the print job generated at step 2104 is changed to the name of the individual who designated printing, i.e., the user name logged in at S601 in FIG. 4, at step 2105.

This is followed by step 2105, at which the print document held by the print acceptance job in the job management unit 552 is converted to data for printing by the printer and this data in incorporated in the print job, thereby completing the print job.

Next, at step 2107, the completed print job is transmitted to the printer, which proceeds to print the job.

Thus, a document possessed by the print service server can be printed in response to a request from a user connected by HTTP.

Furthermore, the job management unit 552 is also capable of monitoring the status of a print job that has been entered to the print service server 101 and of reporting this status to the user terminal 100. For example, if the Job button 1107 in FIG. 11 is pressed, a signal indicative thereof is transmitted to the print service server 101. The latter responds by collecting the status of jobs, for which operation by the user that requested notification of job status has been allowed, from print jobs currently being managed, codes the result in HTML and transmits the resulting signal to the user terminal 100. Included as information relating to the collected print jobs are names of documents to be printed, status indicating whether a job is currently being printed or is awaiting printing, the name of the owner of each job, the times at which jobs were accepted, and names of printers used. Further, jobs that are capable of being operated on by a user generally include jobs below a prescribed protection level in addition to jobs the output of which has been designated by the user.

FIG. 8 illustrates an example of a print job management screen included on the user terminal. Since the owner name column contains the names of all users who have issued print requests from the user terminal, the owner names differ depending upon the print job.

Thus, even if a print job is generated at a server by a print request from a user at a remote terminal, the name of the user who issued the print request is assigned as the name of the owner of this print job. If the status of a print job has been requested, therefore, the server can determine appropriately that the job is one whose status can be presented to the user who issued the request. Furthermore, by observing job status, the user can determine the individual who requested print processing from the owner name of the print job. This makes it possible to accurately ascertain the status of the print job and to provide the user with a comfortable operating environment.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium (or recording medium) storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the novel functions of the embodiment and the storage medium storing the program codes constitutes the invention.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion unit inserted into the computer or in a memory provided in a function expansion unit connected to the computer, a CPU or the like contained in the function expansion unit or function expansion unit performs a part of or the entire process in accordance with the designation of program codes and implements the function of the above embodiment.

Thus, in accordance with the present invention as described above, a print server that provides a remote print service can be made to accurately display the name of the requester of a print job generated by the server, information relating to the print job can be managed accurately and it is possible to enhance operability of job management.

As many apparently widely different embodiments of the present invention can be made without departing from the spirit and scope thereof, it is to be understood that the invention is not limited to the specific embodiments thereof except as defined in the appended claims.

What is claimed is:

1. A method executed in a print server of managing a print job generated in response to a print command that is input from an external unit, said method comprising:
   a step of acquiring a user name;
   a step of inputting a print command corresponding to the user name;
   a step of specifying an owner name of the print job; and
   a job generating step of deleting a name of the print server set as the owner name and setting the user name as the owner name of the print job.

2. The method according to claim 1, wherein said job generating step includes:
   a step of managing a queue by treating a print command document and the user name as a set;
   a step of causing an external module to generate an unassigned print job based upon the print command document when it is the job's turn to be processed; and
   an altering step of altering the owner name of the generated print job to the user name.

3. The method according to claim 1, further comprising a job display step of causing status of a print job to be displayed in accordance with the user name acquired;
   wherein said job display step transmits screen data, which describes the status of the job, to the external unit.

4. The method according to claim 3, wherein said job display step transmits screen data, which describes the status of a print job whose display is allowed with respect to the user name, to the external unit and causes this screen data to be displayed on the external unit.

5. The method according to claim 1, wherein said user name is a log-in name for a print system managing the print job and authenticated by a print server of the print system.

6. An apparatus for managing a print job generated in response to a print command that is input from an external unit, comprising:
   a user name acquisition unit for acquiring a user name;
   an input unit for inputting a print command corresponding to the user name;
   a specification unit for specifying an owner name of the print job; and
   a job generating unit for deleting a name of the print server set as the owner name and setting the user name as the owner name of the print job.

7. The apparatus according to claim 6, wherein said job generating unit includes:
   a management unit for managing a queue by treating a print command document and the user name as a set;
   an unassigned job generating unit for causing an external module to generate an unassigned print job based upon the print command document when it is the jobts turn to be processed; and
   an altering unit for altering the owner name of the generated print job to the user name.

8. The apparatus according to claim 6, further comprising a job display unit for causing status of a print job to be displayed in accordance with the user name acquired;
   wherein said job display unit transmits screen data, which describes the status of the job, to the external unit.

9. The apparatus according to claim 8, wherein said job display unit transmits screen data, which describes the status of a print job whose display is allowed with respect to the user name, to the external unit and causes this screen data to be displayed on the external unit.

10. The apparatus according to claim 6, wherein said apparatus manages document information, and said job generating unit generates a print job from the document information being managed based upon a print command entered via a Web browser of a host computer serving as the external unit.

11. The apparatus according to claim 6, wherein said user name is a log-in name for a print system including said apparatus for managing the print job and authenticated by said apparatus.

12. A computer-readable medium storing a computer program for implementing, by computer, the steps of the method of managing a print job set forth in claim 1.

* * * * *

UNITED STATES PATENT AND TRADEMARK OFFICE
CERTIFICATE OF CORRECTION

PATENT NO. : 7,154,635 B2
APPLICATION NO. : 10/235565
DATED : December 26, 2006
INVENTOR(S) : Shingo Oyama Page 1 of 1

It is certified that error appears in the above-identified patent and that said Letters Patent is hereby corrected as shown below:

ON THE TITLE PAGE:
ITEM (57) ABSTRACT
Line 3, "whose" should read -- who --.

COLUMN 6:
Line 10, "a" should read -- an --; and
Line 41, "an" should read -- a --.

COLUMN 8:
Line 22, "a" should read -- as --; and
Line 54, "it" should read -- is --.

COLUMN 10:
Line 2, "in" (first occurrence) should read -- is --.

COLUMN 12:
Line 22, "jobts" should read -- job's --.

Signed and Sealed this

Twenty-third Day of October, 2007

JON W. DUDAS
*Director of the United States Patent and Trademark Office*